Nov. 30, 1926.
W. L. EVANS
1,609,074
POWER TRANSMISSION MECHANISM
Filed Sept. 16, 1925    2 Sheets-Sheet 1
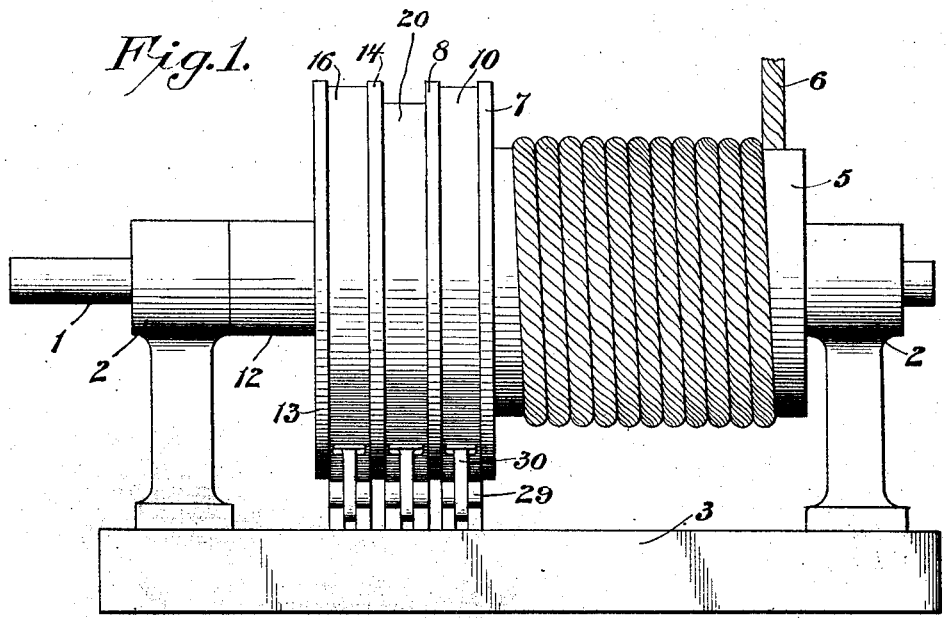
Fig.1.
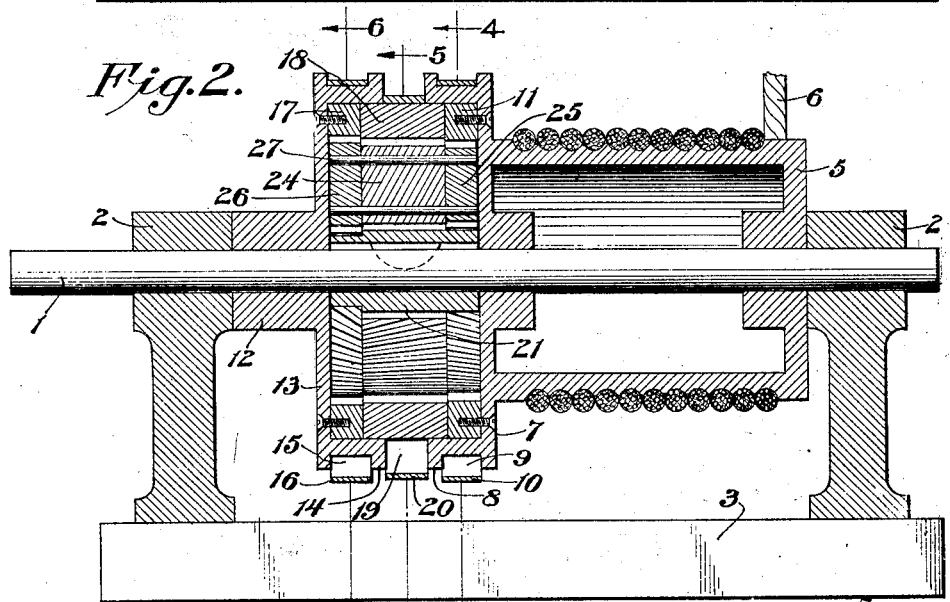
Fig.2.
Fig.8.
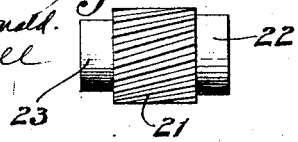
Witnesses
Chas. L. McDonald.
E. N. Lovewell.
Inventor
William L. Evans
By
C. G. Siggers.
Attorney Nov. 30, 1926.
W. L. EVANS
1,609,074
POWER TRANSMISSION MECHANISM
Filed Sept. 16, 1925
2 Sheets-Sheet 2

Witnesses
Chas. L. McDonald
E. N. Lovewell

Inventor
William L. Evans
By E. G. Siggers
Attorney

Patented Nov. 30, 1926.

1,609,074

UNITED STATES PATENT OFFICE.

WILLIAM LEWIS EVANS, OF WASHINGTON, INDIANA.

POWER-TRANSMISSION MECHANISM.

Application filed September 16, 1925. Serial No. 56,723.

This invention relates to a power transmission mechanism, especially adapted for use in hoists, elevators, or other devices where the power is to be transmitted from one rotating or rectilinearly moving element to another.

The objects of the invention include the provision of a simple and practical mechanism, which is easy to operate and easy to control, and by means of which a high multiplication of power may be obtained.

The specific construction of the invention and the principles of its operation will be described in detail in connection with the accompanying drawings, which illustrate one embodiment thereof.

In the drawings:

Figure 1 is a front elevation of the invention.

Figure 2 is a central vertical section taken longitudinally of the power shaft.

Figure 8 is a detail view of the drive gear.

Figure 3:
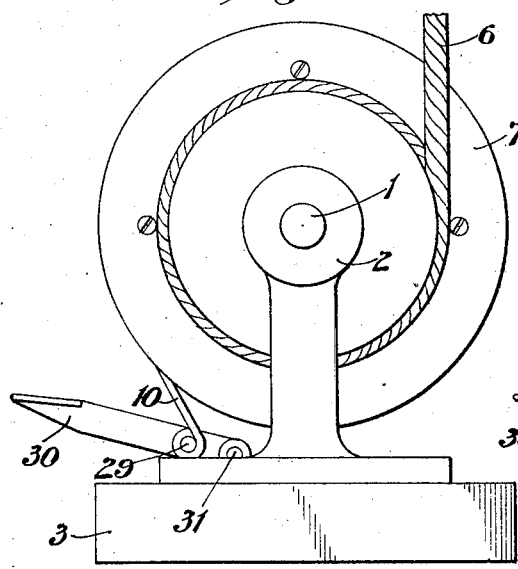
Figure 3 is an end elevation.
Figure 4:
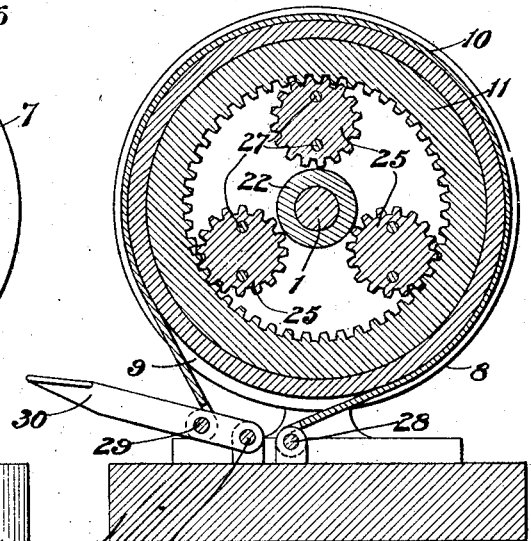
Figure 4 is a section taken on the line 4—4 of Figure 2.
Figure 5:
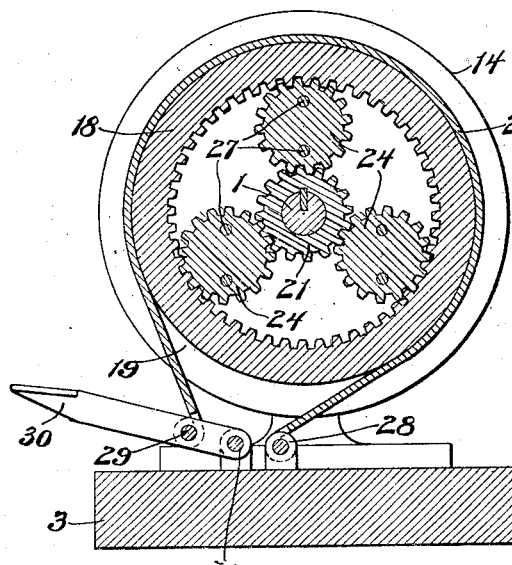
Figure 5 is a section taken on the line 5—5 of Figure 2.
Figure 6:
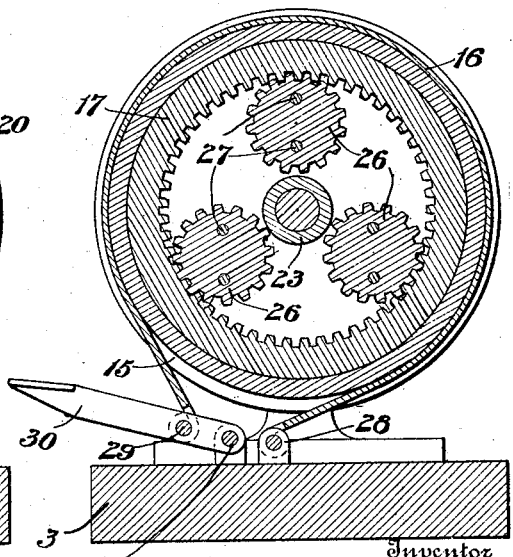
Figure 6 is a section taken on the line 6—6 of Figure 2.

As shown in the drawings, the main power shaft 1 is mounted in suitable bearings 2, which are mounted on a base 3. A drum 5 is journaled on the shaft 1, and is adapted to wind up a cable 6. The present adaptation of the invention is for the purpose of driving the drum 5 from the shaft 1 at a greatly reduced speed, with a corresponding multiplication of power. For this purpose, the inner end of the drum 5 is provided with a peripheral flange or head 7, having a rim 8 formed with a circumferential channel or groove 9, adapted to receive a brake band 10. An internal ring gear 11 is secured to the head 7 inside of the rim 8, and through the medium of this ring gear 11, the drum 5 is driven.

A collar 12 is journaled on the shaft 1, and is provided with a head 13, opposed to the head 7 and spaced therefrom. The head 13 has a rim 14 projecting toward the rim 8, and provided with a circumferential groove or channel 15, which is adapted to receive a brake band 16. An internal ring gear 17 is secured to the head 13 inside the rim 14 and opposite the ring gear 11.

The rims 8 and 14 extend toward each other beyond the respective ring gears 11 and 17, and an intermediate internal ring gear 18 is rotatably held within said rims and between the ring gears 11 and 17. Thus, the central portion of the outer surface of the ring gear 18 and the opposed edges of the rims 8 and 14 form a groove or channel 19, adapted to receive a brake band 20.

Within the housing formed by the heads 7 and 13, a drive gear 21 is secured to the shaft 1. The teeth of this drive gear are entirely within the intermediate ring gear 18, and the ends of the drive gear are in the form of smooth hubs 22 and 23, contained within the ring gears 11 and 17, respectively.

A series of floating gears 24 are mounted between the drive gear 21 and the ring gears 11, 18 and 17. The central portion of each floating gear 24 meshes both with the drive gear 21 and the intermediate ring gear 18. The floating gear 24 is also provided with end sections 25 and 26, which are secured by suitable means, such as the pins 27, so that the three sections of the floating gear act as a unit. The gear section 25 meshes with the internal ring gear 11, and is tangent to the hub 22, while the gear section 26 meshes with the ring gear 17, and is tangent to the hub 23.

Each of the brake bands 10, 20 and 16 is connected at one end to an ear 28, which projects upwardly from the base 3 beneath the gear housing. The other end of the brake band is connected at 29 to a pedal 30, the rear end of which is fulcrumed on an ear 31, located adjacent the ear 28.

When the power shaft 1 is rotated, it is apparent that the floating gears 24 will be rotated, and if all of the brake bands are loose, the floating gears will travel about the drive gear, while the drum 5 remains stationary. By stepping on the pedal which controls the brake band 10, the drum 5 may be held stationary when there is a load on the cable 6. Under these conditions, if the drive gear 21 has sixteen teeth, and the ring gear 18 has forty-eight teeth, as shown in the drawings, the floating gears will complete one circuit for every four revolutions of the drive gear.

Assuming that the ring gear 17 has forty-seven teeth, the ring gear 18 forty-eight teeth, and the ring gear 11 forty-nine teeth, if the intermediate gear 18 is held against rotation by the brake band 20, while the other brake bands remain loose, each circuit of the floating gears will cause a differential movement between the ring gears 18 and 11, and the latter will be advanced a distance of one tooth. The drive gear 21 must, therefore, make approximately 196 revolutions to cause the drum 5 to make one revolution in the same direction. If, however, the ring gear 17, instead of the intermediate gear 18, is held stationary, the ring gear 11 will be advanced a distance of two teeth for every circuit of the floating gears, and the drum 5 will be rotated in the same direction as the rotation of the drive gear 21 with a speed reduction ratio of 98 to 1.

Assuming that the ring gear 17 has forty-seven teeth, the intermediate ring gear 18 forty-nine teeth, and the ring gear 11 forty-eight teeth, if the brake band 20 is set, the drum 5 will drop back one tooth for every revolution of the floating gears, and will be driven in a direction opposite to the rotation of the gear 21 with a speed reduction ratio of 196 to 1, but if the brake band 16 is set instead, the drum 5 will advance one tooth for every revolution of the floating gears, and will be driven in the same direction as the gear 21 with a speed reduction ratio of 192 to 1.

Thus, it will be seen that the transmission may be used in operating an elevator, and so arranged that the elevator may be positively returned twice as quickly as it went up, or it may be returned by gravity and the speed regulated by means of the brake band 10; or it may be arranged so as to give two lifting speeds in the same direction, returning by gravity under control of the brake band 10. The number of teeth may, of course, be varied in accordance with the ratio desired.

It is not expedient to use spur gears for this transmission, for the reason that the number of teeth on a spur gear can not be increased without increasing the pitch diameter or the diametral pitch. Consequently, if spur gears are used, either a fractional pitch must be adopted, or the ring gears will not mesh properly with the floating gears, and there will be lost motion between the same resulting in excessive noise and wear. To obviate this difficulty, I have used helical gears.

Figure 7:
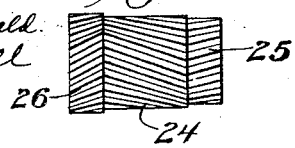
Figure 7 is a detail view of one of the floating gears.

In order to increase the pitch diameter of a helical gear, and at the same time retain the same number of teeth and the same normal diametral pitch, it is only necessary to increase the angle of the teeth, and conversely, to make the gear of less pitch diameter it is only necessary to decrease the angle of the teeth. In ring gear 17, therefore, having forty-seven teeth, as shown in Figures 2 and 7, the angle of the teeth is made greater than the angle of the teeth in the internal ring gear 18 which has forty-eight teeth, and the angle of the teeth in gear 18 is greater than the angle of the teeth in gear 11 which has forty-nine teeth. As a consequence, the angle of the teeth in gear section 26 must be greater than that of the teeth in gear section 24, which, in turn, must be greater than the angle of the teeth in gear section 25, in order that the teeth in all of the floating gear sections will mesh properly with the teeth of the respective ring gears. In order, therefore, to retain the same number of teeth in each of the floating gear sections, the diameters of the sections 25 must be less than the diameters of the sections 24, which, in turn must be less than the diameters of the sections 26. The ring gear 11 then must have a less internal diameter than the ring gear 18, and the latter must have a less internal diameter than the ring gear 17.

The diameters of the hubs 22 and 23 are such that the points of the teeth in the gear sections 25 and 26 respectively, will rest lightly thereon when the gears are at rest, and be held in position thereby. When the gears are revolving, centrifugal force tends to throw them outwardly, and prevents friction between the points of the teeth and the hub.

It is also obvious that since the number of teeth in the ring gear 18 differs by one from the number of teeth in the ring gears 11 and 17, there can be only one point in the circumference where the teeth of all three gears will register with each other. In one of the floating gears, therefore, the sections are arranged so that the teeth are in registry, while on the second floating gear the end sections are arranged so that the teeth are offset circumferentially a distance of one-third of a tooth from the corresponding teeth on the central section 24, and on the third floating gear they are offset a distance of two-thirds of a tooth. By constructing the floating gears in this manner, they may be arranged at approximately equal distances from each other, and will mesh properly with the drive gear 21 and the respective ring gears. If more than three floating gears are used, the relative positions of the gear sections 24, 25 and 26 are correspondingly altered.

While I have shown and described in detail one specific adaptation of the invention, it is obvious that the same may be modified in its construction so as to adapt it to a wide variety of uses. It is my purpose, therefore, to include all such modifications within the scope of the appended claims.

What is claimed is:

1. The combination with a power shaft having a drive gear secured thereto and a smooth hub extending from each side of the drive gear, of internal ring gears surrounding the drive gear and hubs respectively, each of said ring gears having a different number of teeth than the others, a series of floating gears meshing with the drive gear and the intermediate ring gear, each of said floating gears having extensions which are tangent to the respective hubs and mesh with the corresponding ring gears, and means for independently stopping the rotation of any one of the ring gears.

2. The combination with a power shaft having a helical drive gear secured thereto with a smooth hub projecting from each side of the drive gear, of helical internal ring gears surrounding the drive gear and hubs respectively, and a series of helical floating gears meshing with the drive gear and the intermediate ring gear, each of said floating gears having helical gear elements secured to opposite sides thereof which are tangent to the respective hubs and mesh with the corresponding ring gears, each of said ring gears having a different number of teeth than the others, said drive gear, ring gears and floating gear elements all having the same normal diametral pitch.

3. The combination with a power shaft having a helical drive gear secured thereto with a smooth hub extending from each side of the drive gear, of helical internal ring gears surrounding the drive gear and hubs respectively, a series of floating gears meshing with the drive gear and the intermediate ring gear, each of said floating gears having other gear elements secured to opposite sides thereof, one being of greater diameter and the other of less diameter but having the same normal diametral pitch as the central part of the floating gear, said gear elements being tangent to the respective hubs and meshing with the corresponding ring gears, the latter being correspondingly different in diameter than the intermediate ring gear, and the hub being correspondingly different in diameter than the drive gear.

4. The combination with a power shaft having a helical drive gear secured thereto with oppositely projecting smooth hubs, of helical internal ring gears surrounding the drive gear and hubs respectively, each of said ring gears having a different number of teeth than the others, and a series of floating gears meshing with the drive gear and the intermediate ring gear, each of said floating gears having gear elements connected to opposite sides thereof which are tangent to the respective hubs and mesh with corresponding ring gears, all of said gears having the same normal diametral pitch, the ring gear having the greater number of teeth being of smaller diameter.

5. The combination of a power shaft having a helical drive gear secured thereto with a smooth hub projecting from each side of said gear, of helical internal ring gears surrounding the drive gear and hubs respectively, each of said ring gears having a different number of teeth than the others, a series of floating gears meshing with the drive gear and the corresponding ring gear, each of said floating gears having extensions in the form of gear elements connected to opposite sides thereof which are tangent to the respective hubs and mesh with the corresponding ring gears, the teeth on one of said floating gear extensions being in registry with the teeth on the main portion of the floating gear to which they are connected, and the teeth on each of the other floating gear extensions being circumferentially offset with respect to the teeth on the main floating gear to which they are respectively connected, to correspond to the relative positions of the teeth in the respective ring gears where said floating gears are to be inserted.

6. The combination with a power shaft having a drive gear and a hub secured thereto, of internal ring gears surrounding the drive gear and hub respectively, one of said ring gears having more teeth than the other, a series of floating gears meshing with the drive gear and the corresponding ring gear, each of said floating gears having another gear connected thereto which is tangent to the hub and meshes with the other internal gear, and means for independently stopping the rotation of either ring gear.

7. The combination with a power shaft having a helical drive gear and a hub secured thereto, of helical internal ring gears surrounding the drive gear and hub respectively, and a series of helical floating gears meshing with the drive gear and the corresponding ring gear, each of said floating gears having another helical gear connected thereto which is tangent to the hub and meshes with the other ring gear, one of said ring gears having more teeth than the other, said drive gear, ring gears and floating gears all having the same normal diametral pitch.

8. The combination with a power shaft having a helical drive gear and a hub secured thereto, of helical internal ring gears surrounding the drive gear and hub respectively, a series of floating gears meshing with the drive gear and the corresponding ring gear, each of said floating gears having another gear secured thereto and of greater diameter but having the same normal diametral pitch, said last-mentioned gear being tangent to the hub and meshing with the other ring gear, the latter being correspondingly larger in diameter than the first ring gear, and the hub being smaller in diameter than the drive gear.

9. The combination with a power shaft having a helical drive gear and a hub secured thereto, of helical internal ring gears surrounding the drive gear and hub respectively, one of said ring gears having more teeth than the other, and a series of floating gears meshing with the drive gear and the corresponding ring gear, each of said floating gears having another gear connected thereto which is tangent to the hub and meshes with the other ring gear, all of said gears having the same normal diametral pitch, the ring gear having the greater number of teeth being of smaller diameter than the other ring gear.

10. The combination with a power shaft having a helical drive gear and a hub secured thereto, of helical internal ring gears surrounding the drive gear and hub respectively, one of said ring gears having more teeth than the other, a series of floating gears meshing with the drive gear and the corresponding ring gear, each of said floating gears having another gear connected thereto which is tangent to the hub and meshes with the other ring gear, the teeth on the sections of one floating gear being opposite each other, and the other floating gears having the teeth of one section circumferentially advanced with respect to the other section to correspond to the relative positions of the teeth in the ring gears where the floating gears are to be inserted.

In testimony, that I claim the foregoing as my own, I have hereto affixed my signature.

WILLIAM LEWIS EVANS.